United States Patent
Fumarola et al.

(10) Patent No.: US 11,958,434 B2
(45) Date of Patent: Apr. 16, 2024

(54) FOUR-POINT SEAT BELT AND RELATIVE ROAD VEHICLE

(71) Applicant: FERRARI S.P.A., Modena (IT)

(72) Inventors: Gianluca Fumarola, Modena (IT); Elena Pettinato, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 18/154,103

(22) Filed: Jan. 13, 2023

(65) Prior Publication Data
US 2023/0226994 A1    Jul. 20, 2023

(30) Foreign Application Priority Data
Jan. 19, 2022    (IT) .................. 102022000000785

(51) Int. Cl.
*B60R 22/12* (2006.01)
*B60R 22/16* (2006.01)

(52) U.S. Cl.
CPC .................. *B60R 22/16* (2013.01)

(58) Field of Classification Search
CPC ................ B60R 22/02; B60R 22/16
See application file for complete search history.

(56) References Cited

U.S. PATENT DOCUMENTS

| | | | | |
|---|---|---|---|---|
| 3,444,957 A * | 5/1969 | Gilpin, Jr. | ............... | A62B 35/04 182/3 |
| 5,050,906 A * | 9/1991 | Kneip | .............. | B60R 22/16 280/805 |
| 5,529,343 A * | 6/1996 | Klink | ............. | B60R 22/16 280/805 |
| 10,625,708 B2 * | 4/2020 | Jessup | ............. | B60R 22/16 |
| 2013/0033056 A1 | 2/2013 | Tunis, III et al. | | |
| 2018/0312134 A1* | 11/2018 | Jessup | ............. | B60R 22/16 |
| 2019/0061680 A1* | 2/2019 | Wang | ............. | B60R 22/02 |

FOREIGN PATENT DOCUMENTS

| | | |
|---|---|---|
| AU | 517944 B2 | 9/1981 |
| EP | 1069008 A1 | 1/2001 |
| GB | 2211070 A | 6/1989 |
| WO | 2018189396 A1 | 10/2018 |

OTHER PUBLICATIONS

Italian Search Report for Application No. IT 102022000000785; Filing Date—Jan. 19, 2022; dated Sep. 7, 2022, 7 pages.

* cited by examiner

*Primary Examiner* — Paul N Dickson
*Assistant Examiner* — Maxwell L Meshaka
(74) *Attorney, Agent, or Firm* — CANTOR COLBURN LLP

(57) ABSTRACT

Four-point seat belt comprising two thoracic branches configured to anchor the chest of a user to a backrest of a vehicular seat; two abdominal branches configured to girdle and anchor the waist of the user to the vehicular seat; at least one damping device configured to be activated upon exceeding a first predetermined value of a tension force imparted by the user to the belt; wherein the damping device is configured to cause, upon its activation, a controlled advancement of the chest of the user while limiting the acceleration of the head of the user.

13 Claims, 8 Drawing Sheets

FOUR-POINT SEAT BELT AND RELATIVE ROAD VEHICLE

CROSS-REFERENCE TO RELATED APPLICATIONS

This patent application claims priority from Italian patent application no. 102022000000785 filed on Jan. 19, 2022, the entire disclosure of which is incorporated herein by reference.

TECHNICAL FIELD

The present invention relates to a four-point seat belt and to a relative road vehicle.

In particular, the present invention is advantageously but not exclusively applied to a high-performance road vehicle provided with four-point seat belts, to which the following description explicitly refers, without thereby losing generality.

PRIOR ART

Generally, road vehicles are provided with passive safety systems of different type. One of said passive safety systems, particularly widespread and mandatory in most of the world, is the seat belt.

Historically, in highly performing vehicles, such as for example cars designed both for the normal road use, and for running on track maximising the performances, four-point seat belts are used, i.e. configured to anchor the user (the passenger or the driver) to the frame of the vehicle by means of four different branches or bands (usually two thoracic branches or shoulder straps and two abdominal or waist branches). Generally, each of these branches comprises a fixed portion and a portion adjustable by the user depending on the body features and on the preferences of said user (i.e. how much the user wants the seat belt to clench him/her).

The above-mentioned four-point seat belts are closed (hooked) by means of a centrally arranged buckle. In particular, the adjustable portions of the shoulder straps are usually sewn at intermediate points of the adjustable portions of the waist bands, so as to allow a quick closing of the buckle by simply coupling the two waist bands.

Because of the strong dynamics to which highly performing vehicles are subject while travelling on track, in order to keep the driver steady in the driving position, the above-mentioned four-point seat belts, unlike the three-point seat belts of common use in road vehicles, anchor the back of the user in an integral manner to the seat accommodating him/her; in other words, the four-point seat belts do not allow a deviation of the chest or of the waist of the user as the common three-point seat belts, which enable the driver to change position on the seat or inclination based on his/her preferences, by virtue of the fact that the vehicular dynamics are mild. On the other hand, the use of bands with elastic adaptation such as that of the three-point seat belts of common cars would determine an uncontrolled movement of the user during the strong longitudinal and lateral accelerations due to the above-mentioned dynamics, i.e. during the normal operation of the vehicle, compromising the performances thereof.

The integral anchoring of the trunk of the user to the seat, however necessary in terms of performance, determines risks in case of crashes or accidents, since, in the case for example of front impact, the only part of the body of the user not anchored, i.e. the head, is entirely subjected to the (negative) acceleration due to the impact and is thrusted forward without control, risking to cause injuries, faints (which can be lethal in the case when the vehicle catches fire after the accident), etc.

DESCRIPTION OF THE INVENTION

The object of the present invention is to provide a four-point seat belt and a relative road vehicle which are at least partially exempt from the above-described drawbacks and, simultaneously, are simple and cost-effective to manufacture.

According to the present invention, a four-point seat belt and a relative road vehicle are provided according to what claimed in the following independent claims and, preferably, in any one of the claims directly or indirectly dependent on the independent claims.

The claims describe preferred embodiments of the present invention forming integral part of the present description.

BRIEF DESCRIPTION OF THE DRAWINGS

The present invention will now be described with reference to the accompanying drawings, which illustrate some non-limiting example embodiments thereof, wherein.

PREFERRED EMBODIMENTS OF THE INVENTION

Figure 1:
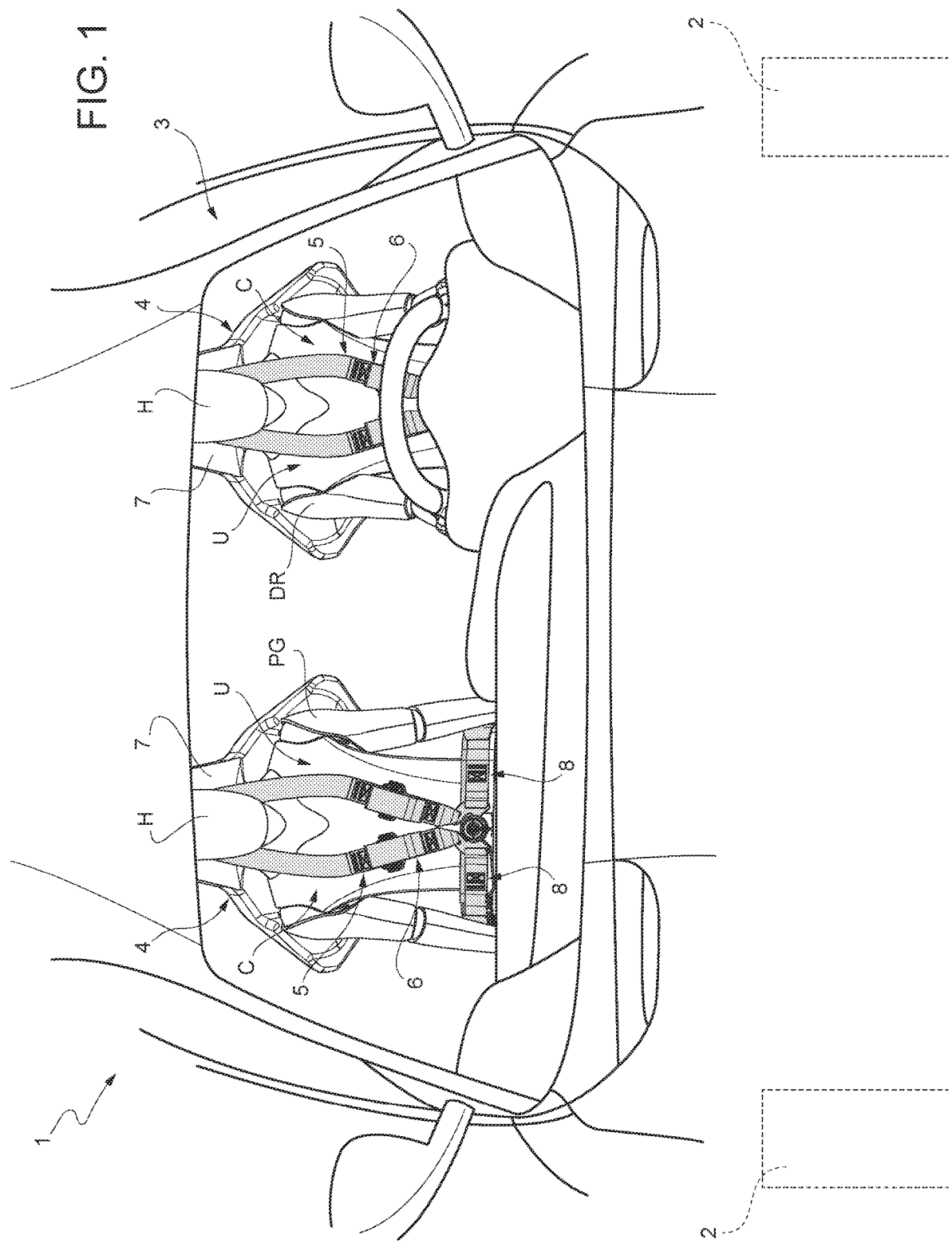
FIG. 1 is a perspective and schematic view, with details removed for clarity, of a front portion of a road vehicle in accordance with the present invention through a windshield.

In FIG. 1, reference numeral 1 indicates, as a whole, a road vehicle provided with two front wheels 2 and with two rear wheels (in particular driving wheels). The vehicle 1 is provided with a passenger compartment 3 which is adapted to house one or more users U, such as the driver DR and one or more passengers PG as is illustrated in FIG. 1.

The same reference numerals and the same reference letters in the figures identify the same elements or components with the same function.

Within the scope of the present description, the term "second" component does not imply the presence of a "first" component. Such terms, in fact, are used as labels for improving the clarity and are not to be understood in a limiting manner.

The elements and the features illustrated in the different preferred embodiments, including the drawings, can be combined with each other without thereby departing from the scope of protection of the present application as described in the following.

The vehicle 1 further comprises at least one seat 4, in particular a seat 4 for each user U to be housed inside the passenger compartment 3.

Figure 2:
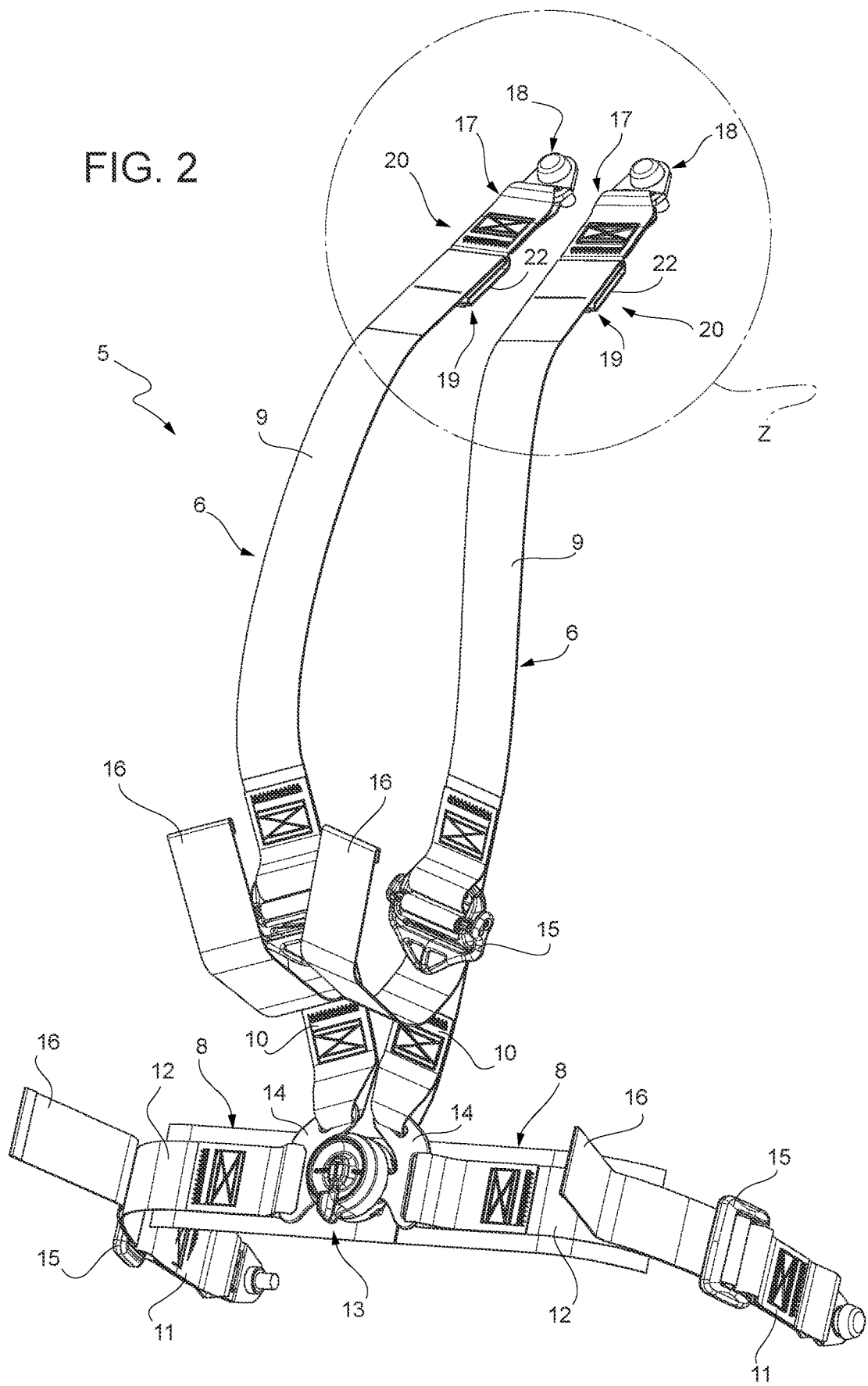
FIG. 2 is a perspective and schematic view, with details removed for clarity, of an embodiment of a four-point seat belt in accordance with the present invention.

Advantageously, as is illustrated in the non-limiting embodiments of FIGS. 1 and 2, the vehicle 1 comprises at least one 4-point seat belt 5, in particular a seat belt 5 for each seat 4; in the case of a two-seat road vehicle as the one illustrated in FIG. 1, the road vehicle 1 comprises a four-point seat belt for the driver DR and a four-point seat belt 5 for the passenger PG.

As is illustrated in the non-limiting embodiments of FIGS. 1 and 2, the seat belt 5 comprises two thoracic branches 6 configured to anchor (during the normal use, in an integral manner) the chest C of the user U to a backrest 7 of the vehicular seat 4.

Furthermore, the seat belt 5 comprises two abdominal branches 8 configured to girdle and anchor the waist of the user to a seat (of known type and not illustrated) of the vehicular seat 4.

In particular, the thoracic branches 6 and the abdominal branches 8 are substantially formed starting from bands of fabric of known type and therefore not more specified in the following (i.e. wefts comprising polymers, for example polyester).

As is illustrated in the non-limiting embodiment of FIG. 2, advantageously but not necessarily, the thoracic branches 6 comprise a fixed portion 9 and a portion 10 adjustable by the user U, respectively, for making the seat belt 5 adhere.

As is illustrated in the non-limiting embodiment of FIG. 2, advantageously but not necessarily, the abdominal branches 8 comprise a fixed portion 11 and a portion 12 adjustable by the user U, respectively, for making the seat belt 5 adhere.

Advantageously but not necessarily, the thoracic branches 6 and the abdominal branches 8 centrally converge at a same buckle 13 configured to be arranged in the centre of the (sub)abdominal of the user U. In particular, in order to facilitate the closing and the opening of the seat belt 5, the right and left thoracic branches 6 converge towards respective connecting elements 14 with the right and left abdominal branches 8.

Preferably but not necessarily, each fixed portion 9, 11 is arranged in a distal position with respect to the buckle 13, whereas each adjustable position 10, 12 is arranged between the buckle 13 and the respective fixed portion 9, 11 to which it is connected by means of an adjusting element 15, which in turn is coupled in an integral manner to the fixed portion 9, 11, and in an adjustable manner (sliding) to the adjustable portion 10, 12. Therefore, in particular, the user U can adjust the seat belt 5 by pulling respective edges 16 of each adjustable portion 10, 12 (in particular coming out of the adjusting element 15).

Advantageously but not necessarily, the thoracic branches 6 and the abdominal branches 8 each comprise an end 17, which is configured to be mechanically coupled to a portion of vehicular frame (or integral with it) by means of fixing means 18 (of known type and not more specified).

Preferably, as is illustrated in the non-limiting embodiment of FIG. 2, the ends 17 are comprised in the fixed portion 9, 11 of the respective thoracic 6 and abdominal 8 branches.

In particular, the thoracic branches 6 connect the fixing means 18 to the adjusting element 15 by means of a band (of fabric) seamlessly.

Figure 3:
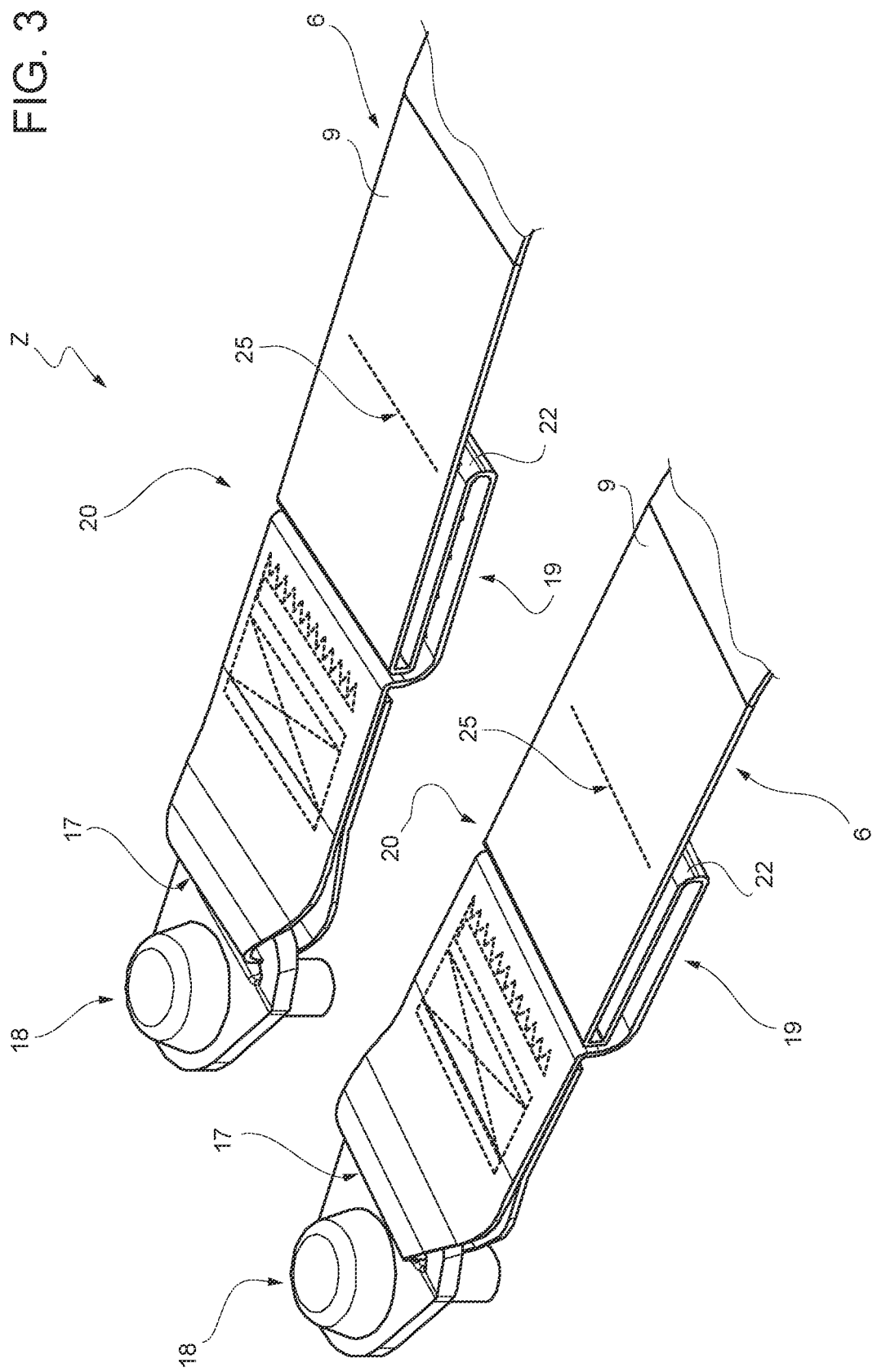
FIGS. 3 to 6 are perspective and schematic views, with details removed for clarity, of a portion of the seat belt of FIG. 2 in different operating configurations.

Advantageously, the seat belt 5 comprises at least one damping device 19, which is configured to be activated upon exceeding a first predetermined value TS' of a tension force F (FIGS. 3-5) imparted by the user U to the seat belt 5 (in particular to the fixed portion 9 of each thoracic branch 6). In particular, the damping device is configured to cause (generate), upon its activation, a controlled advancement of the chest C of the user U while limiting the acceleration of the head H of said user U.

According to some preferred non-limiting embodiments such as the ones illustrated in FIGS. 3 to 7, the damping device 19 is configured to cause a controlled advancement of the chest by extending (i.e. increasing the length) a portion 20 of the seat belt with an extension stroke E from 30 mm to 300 mm, in particular from 50 mm to 150 mm, more in particular of 100 mm.

Advantageously but not necessarily, la seat belt 5 comprises two damping devices 19, each of which is arranged along the fixed portion 9 of each of the thoracic branches 6. In particular, the damping devices 19 are arranged in a part of the fixed portion 9, which preferably is not in contact with the user U (in other words, the portion 20 is not in contact with the user U). In some non-limiting cases, the damping devices 19 are arranged behind the seat 4 (i.e. behind the backrest 7).

Specifically, the damping devices 19 are arranged at a distance less than 300 mm (preferably less than 200 mm, in particular less than 100 mm) from the end 17 or from the fixing means 18.

Advantageously but not necessarily, and as is illustrated in the non-limiting embodiments of FIGS. 4 to 7, each damping device 19 comprises one or more damping seams 21, which are configured to break or unravel (in a controlled manner) upon the activation of said damping device 19. In such manner, the unravelling or the breaking of such seams 21 enables gradually making the chest C of the user U advance, reducing the stresses on the head H. In particular, the damping seams 21 are made directly on the band (i.e. on the fabric) which defines the thoracic branch 6.

Advantageously but not necessarily, at the portion 20, the damping device 19 comprises a fold 22 of the fixed portion 9 of the respective thoracic branch 6. Preferably, the fold 22 is made as a U. In other words, at the portion 20, the band of fabric which defines the thoracic branch 6 is U-folded on itself, forming a buffer which enables the extension of the thoracic branch 6 upon the activation of the damping device 19.

Preferably, during the damping, the U-fold 22 is unfolded. In other words, the branches of the U forming the fold 22 are spaced apart from each other, making the portion 20 rectilinear. This allows avoiding having to introduce metal buckles which could break or deform in an uncontrolled manner during the damping and damage the driver DR.

In particular, the damping device 19 does not comprise any metal element. This allows avoiding manufacturing defects or melting of the metal which could compromise the safety of the driver DR during an accident.

In particular, the fold 22 comprises two branches having identical length equal to half of the above-mentioned extension E.

Figure 4:
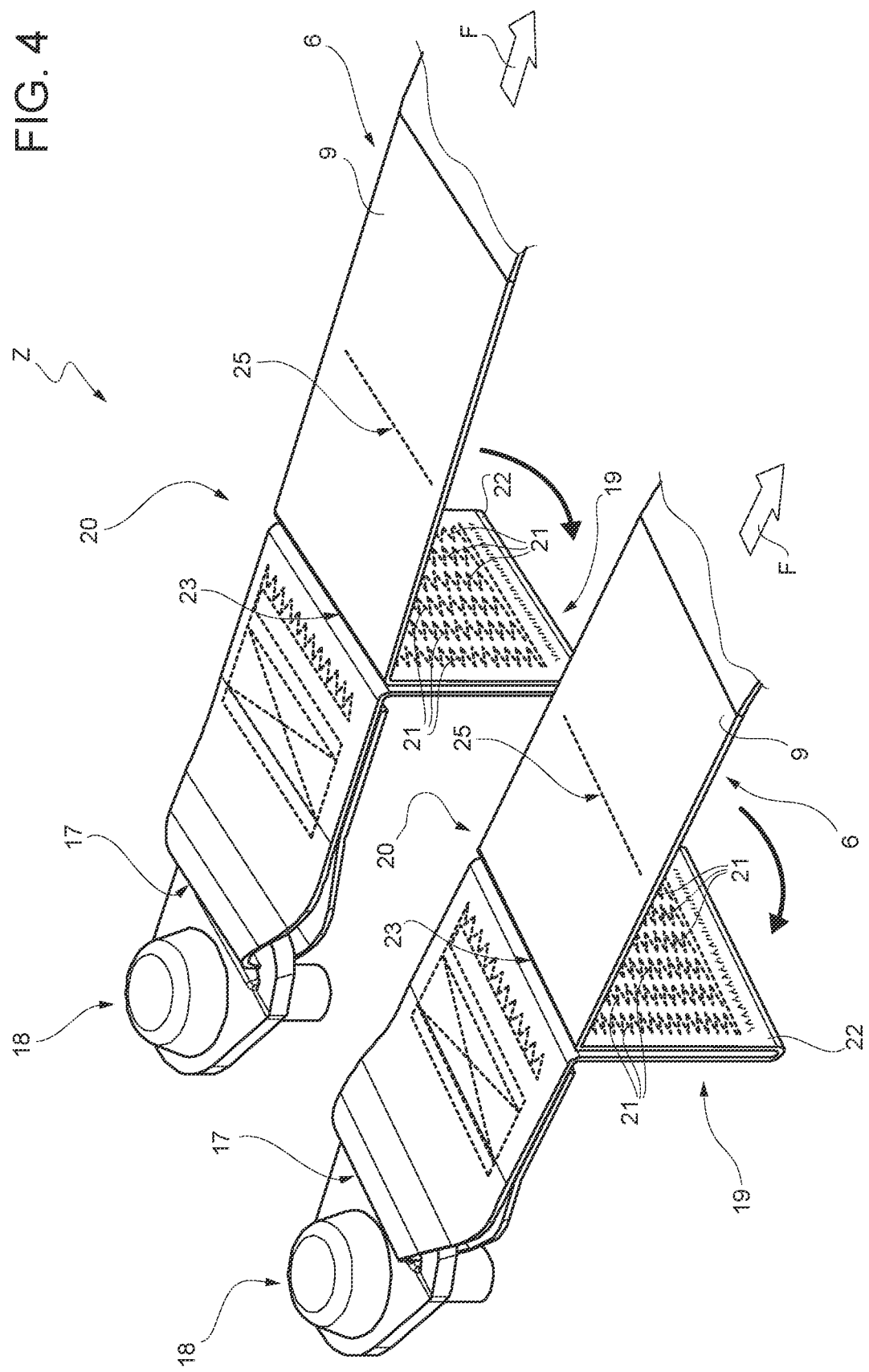
Figure 5:
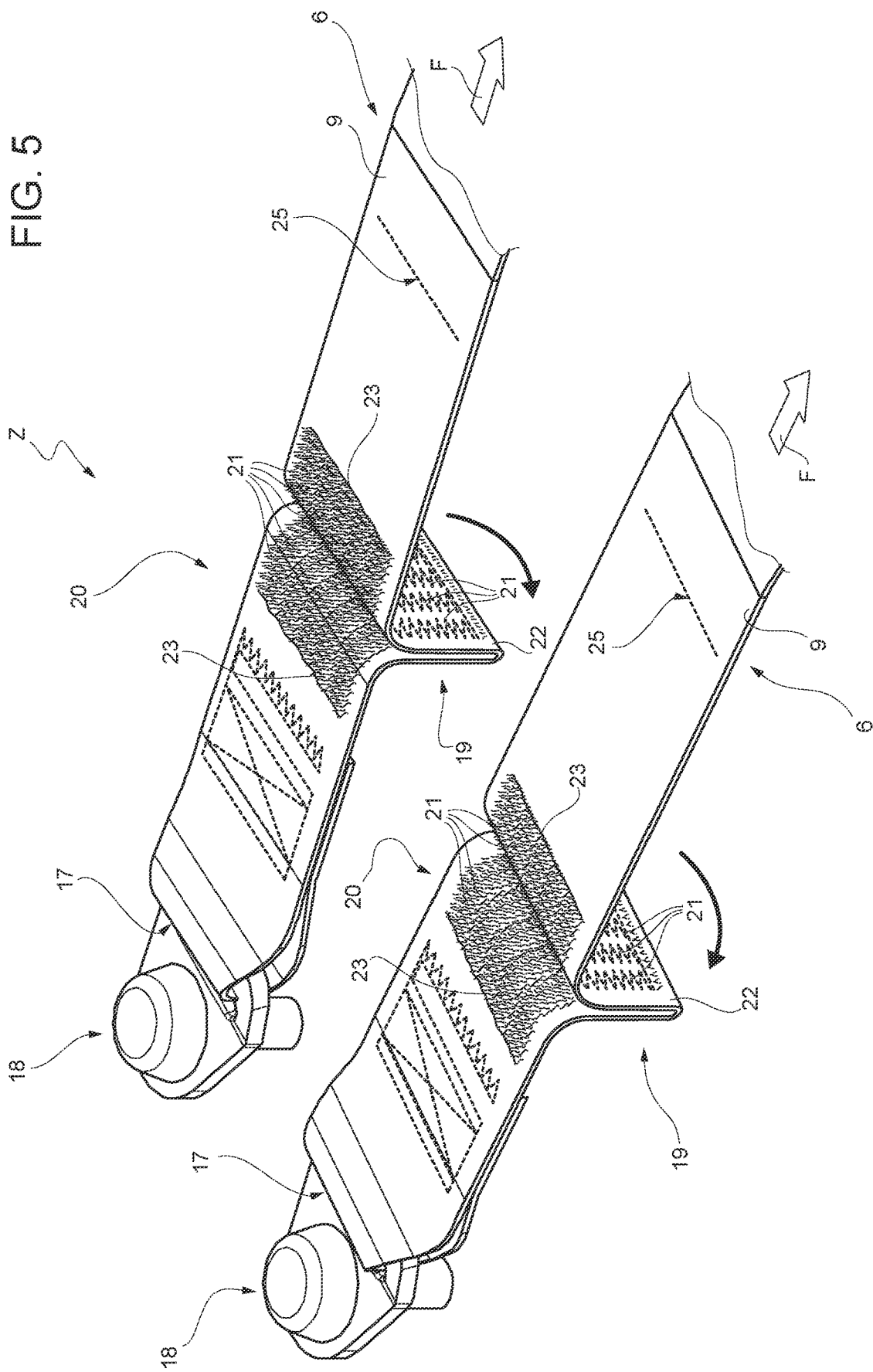

In some non-limiting cases, as the one illustrated in FIGS. 4 and 5, the fold 22 is made so as to project from the fixed portion 9 and direct the concavity downwards during the damping. In other non-limiting cases not illustrated, the fold 22 is made so as to project from the fixed portion 9 and direct the concavity upwards during the damping.

Figure 7:
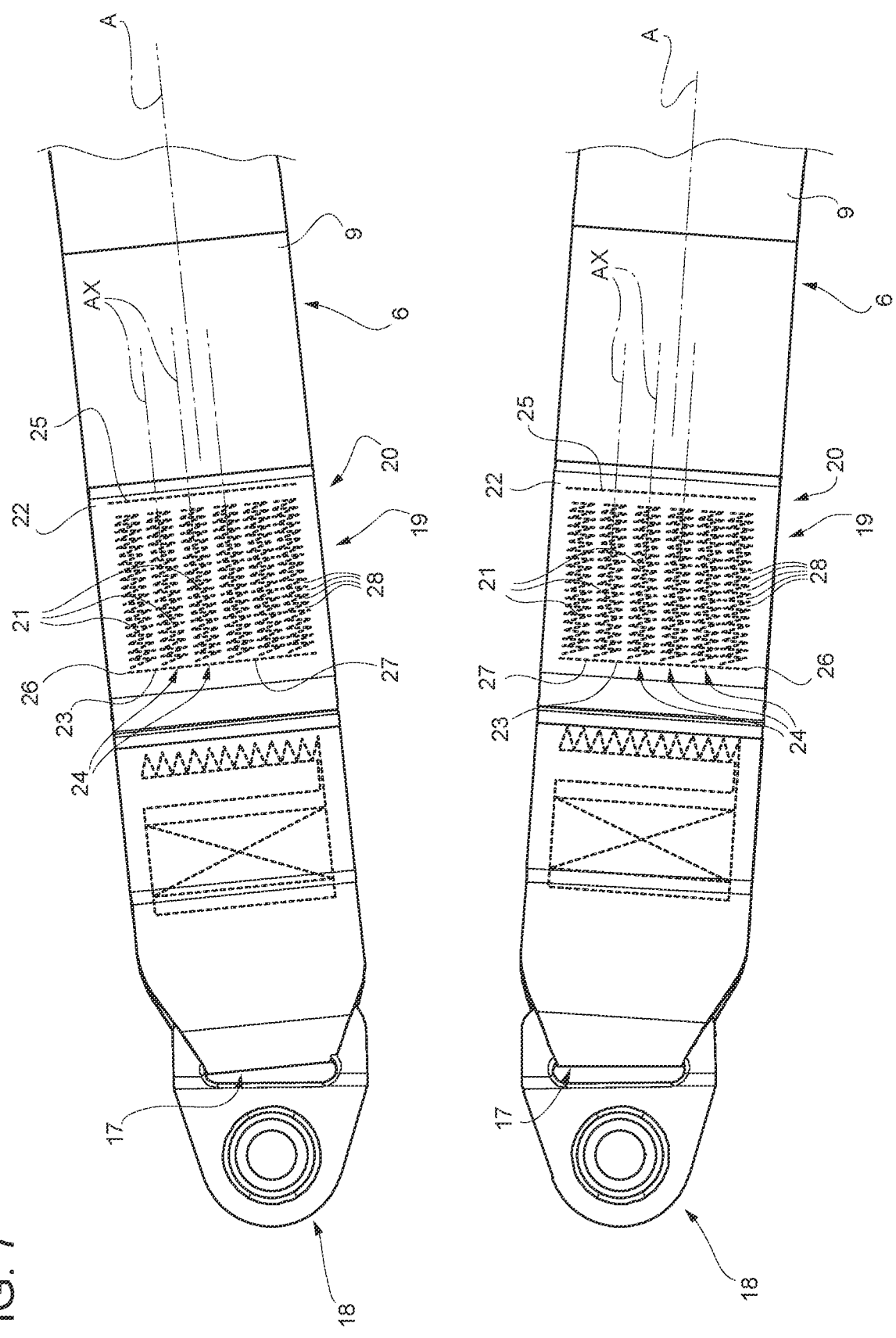
FIG. 7 is a bottom schematic view of the seat belt portion of FIG. 3.

According to some preferred but non-limiting embodiments, such as the one illustrated in FIG. 7, the damping device 19 comprises an activation seam 23 arranged at an end 24 of the damping seam 21 and configured to break or unravel upon reaching the first predetermined value TS'.

In some non-limiting cases, such as the ones illustrated in FIGS. 2 to 7, the seams 21 are made so as to have respective longitudinal axes AX substantially parallel to a longitudinal axis A of the thoracic branch 6 on which the damping device 19 is located.

Advantageously but not necessarily, the activation seam 23 is arranged transversally to the axis A of the thoracic branch 6. In particular, the activation seat belt 23 is arranged perpendicularly to the axis A. More in particular, the activation seam 23 extends for most of (substantially the totality of, or anyway so as to be in contact with all the damping seams 21) the width of the thoracic branch 6.

In some preferred non-limiting cases, the activation seam 23 connects the damping seams 21 to each other. In the non-limiting embodiment of FIG. 7, the damping seams 21 have the ends 24 substantially aligned. In other words, the damping seams 21 converge, on the side of the ends 24, in the activation seam 23.

In particular, the activation seam 23 is made so as to allow the breaking/unravelling of the damping seams 21 only after the activation seam 23 has been in turn broken or unravelled by the force F.

Advantageously but not necessarily, the damping device 19 comprises a sacrificial seam 25, which is made so as to maintain the thoracic branches 6 substantially with a planar configuration. In particular, the planar configuration is maintained by folding into S shape the portion 20 of the seat belt 5, preferably further folding on itself the U-shaped fold 22. In such manner it is possible to reduce the bulks, for example facilitating the insertion of the branches 6 in the specially provided holes or housings which are often pre-arranged in the seats 4. Furthermore, in such manner there is no risk of inadvertently ruining the activation seam 23, giving the possibility to visually and quickly verify the integrity of the damping device 19.

Advantageously but not necessarily, the sacrificial seam 25 is arranged transversally to the axis A of the thoracic branch 6. In particular, the sacrificial seat belt 25 is arranged perpendicularly to the axis A. More precisely the sacrificial seam 25 is counterposed to the activation seam 23 with respect to the damping seams 21.

Preferably but not limitedly, the sacrificial seam 25 is configured to direct the fold 22 towards the user U.

According to some preferred but non-limiting embodiments such as the one illustrated in FIG. 7, the sacrificial seam 25 is configured to break or unravel upon reaching a second predetermined value TS" of the tension force F. In particular, the second value TS" is lower than the first predetermined value TS'. In such manner, upon the increase of the load and thus of the tension force F of the seat belt 5 (for example due to an accident), the sacrificial seam 25 is the first to yield (unravels or tears) (see FIG. 4), the activation seam 23 is the second to yield (unravels or tears) followed by the damping seams 21 (see FIGS. 5 and 6).

According to some non-limiting embodiments, such as the one illustrated in FIG. 7, the one or more damping seams 21 have a zigzag structure. In such manner, it is possible to increase the length of a continuous seam 21, which can gradually unravel occupying less space.

Advantageously but not necessarily, the damping seams 21 comprise a plurality of bridges 28 comprised between 5 mm and 13 mm.

Advantageously but not necessarily, the step of the sacrificial seam 25 is less than 10 mm, in particular less than 5 mm, preferably 2.5 mm.

In some preferred non-limiting cases, each damping seam 21 comprises at least twenty, in particular at least thirty, preferably at least forty bridges 28.

Preferably, therefore, the damping device 19 comprises a plurality of damping seams 21 arranged parallel to each other. In particular, in accordance with what mentioned in the foregoing, the parallel damping seams 21 are configured to be activated by means of the transverse activation seam 23 which connects the respective ends 24 thereof.

Advantageously but not necessarily, the activation seam 23 is made with one or more sections along the same row, in particular starting from an initial outer point 26 and ending with a final inner point 27, i.e. arranged along an intermediate portion between the ends of the activation seam 23.

According to some preferred non-limiting embodiments, the damping seams 21 and the activation seam 23 are made by means of a single continuous seam. In particular, not limitedly, the damping seams 21 are made starting from the end 24 carrying out a rectilinear section and re-travelling the narrow zig zag section, progressively making (while moving from one damping seam 21 to the other) the activation seam 23.

Preferably, the activation seam 23 has a length which ranges from 20 mm to 60 mm, in particular from 30 mm to 50 mm, more in particular from 38 mm to 43 mm.

Advantageously but not necessarily, as is illustrated in the non-limiting embodiment of FIG. 7, the damping device 19 comprises at least five, in particular six, parallel damping seams 21.

In particular, the damping seams 21 and/or the activation seam 23 and/or the sacrificial seam 25 are made by coupling to each other two different yarns (inserted, as is known and thus not more specified in the following, by means of needle and reel).

Advantageously but not necessarily, a first yarn used for making the damping seams 21 (and/or the activation seam 23 and/or the sacrificial seam 25) is an interweaved yarn (preferably Nyflex). Preferably such interweaved yarn comprises between two and five yarns having a metric figure from 15 to 30, in particular from 18 to 25. Specifically, not limitedly, it is an Nm 20/3 yarn, i.e. obtained by interweaving between each other three yarns with metric figure Nm equal to 20. A second type of yarn used for making the damping seams 21 (and/or the activation seam 23 and/or the sacrificial seam 25) is a single yarn (preferably Nyster) having a metric figure comprised between 80 and 150, more precisely between 110 and 130, specifically 125. The above-mentioned values relative to the yarns were obtained empirically so as to maximise repeatability and acceptability of the load according to the laws in force (ECE).

In some non-limiting cases, the damping 21 and/or activation 23 and/or sacrificial 25 seams are made by means of yarns (or compositions of yarns) different from each other.

In particular, preferably but not limitedly, the sacrificial seam 25 is made by means of a single yarn (preferably Nyster) having a metric figure comprised between 80 and 150, more precisely between 110 and 130, specifically 125.

Figure 8:
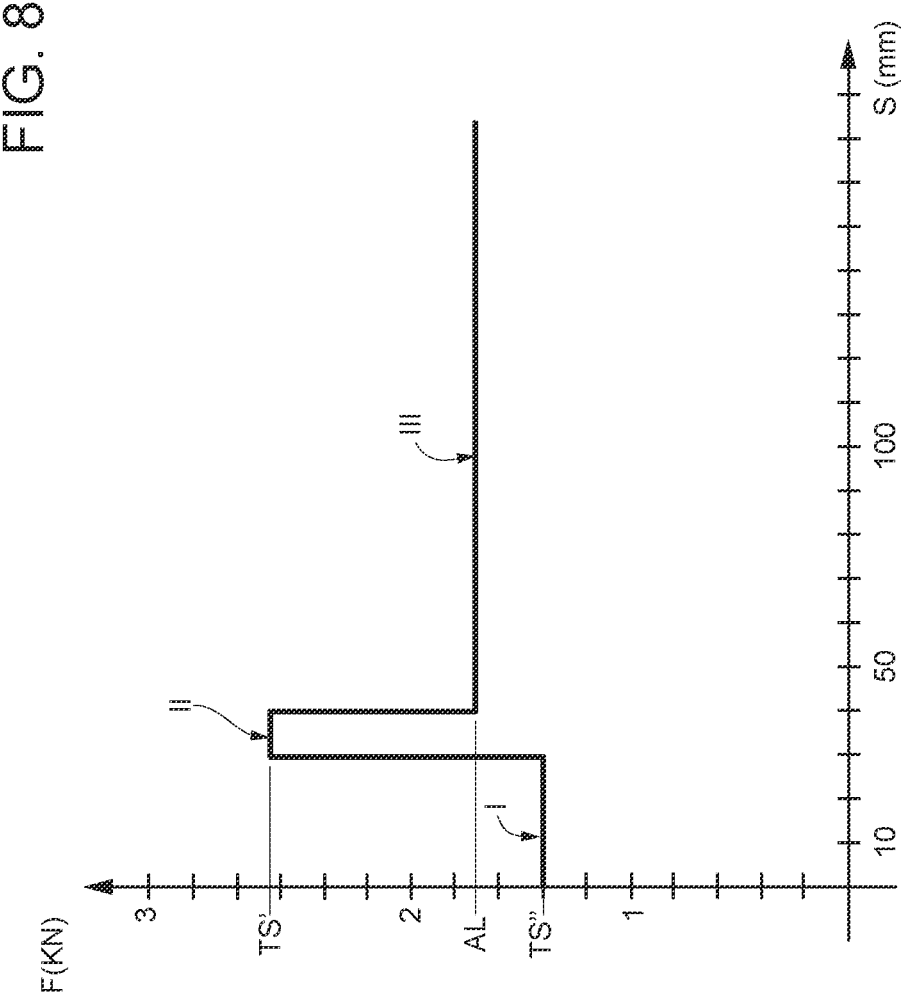
FIG. 8 illustrates a graph which shows the tension variation with respect to the extension of a portion of the part of the seat belt in the steps of the sequence of FIGS. 4 to 6.

According to some preferred but non-limiting embodiments such as the one illustrated in FIG. 8, the first predetermined value TS' ranges from 1 kN to 5 kN, in particular from 1.5 kN to 3.5 kN. In other words, the activation seam 23 is made so as to yield upon the reaching of such loads; for example, in the case where there is a deceleration which generates a tension force F greater than 2 kN, the activation seam 23 yields activating the unravelling/breaking of the damping seams 21.

Advantageously but not necessarily, the one or more damping seams 21 are configured to break or unravel at an average load AL which ranges from 1 kN to 3 kN, in particular from 1.5 kN to 2.5 kN. In such manner, the breaking/unravelling of the bridges 28 is gradual, allowing reducing the dynamic load at the head H of the users U.

Alternatively or additionally, the second predetermined value TS" ranges from 0.8 kN to 2.5 kN, in particular from 1 kN to 2 kN.

Obviously, the precise values of the above-mentioned ranges depend on different side conditions relative each time to the type of considered vehicle 1.

Figure 6:
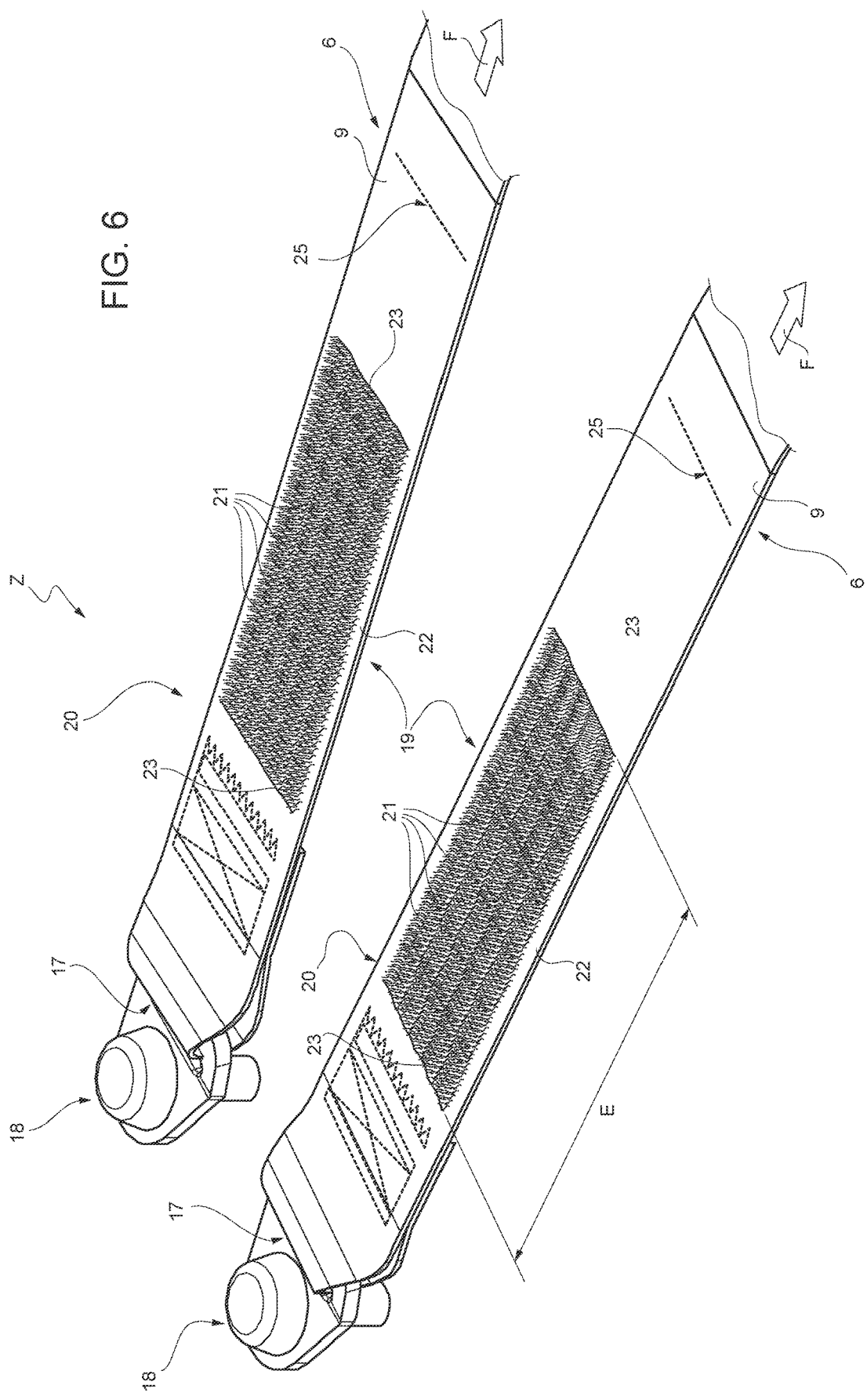

In use, therefore, in case of accelerations above normal, for example due to an accident, the zone Z (illustrated specifically in FIGS. 3 to 6) preferably passes from a resting folded planar configuration (FIG. 3), wherein the portion 20 is folded twice on itself, i.e. folded into S-shape, and all the seams 21, 23 and 25 are intact, at an extended configuration (still planar) such as the one of FIG. 6, wherein the seams 21, 23 and 25 are broken or unravelled (passing in particular by the intermediate configurations of FIGS. 4 and 5 wherein only the sacrificial seam 25 is unravelled/broken respectively and wherein the sacrificial seam 25, the activation seam 23 and part of the damping seams 21 are unravelled/broken).

In the non-limiting embodiment of FIG. 8 a graph is illustrated in which the axis of the abscissae indicates a space S of the extension E in millimetres (for example from a space S=0 that represent the moment prior to an impact of the vehicle 1 in an accident), whereas the axis of the ordinates indicates the tension force F in kN. In particular, it is possible to discern three distinct steps I, II and III: step I indicates (with a peak/step) the tension force F which causes the sacrificial seam 25 to break once the value TS" has been reached; step II (characterised by a peak greater than the one of step I) indicates the variation of the tension force F upon the reaching of the heat TS', in particular the peak is given at the breaking/unravelling of the activation seam 23, to which a lessening of the force F follows which tends to the average load AL during step III, i.e. while the damping seams progressively yield. Therefore, the three steps I, II, III subsequent to each other are characterised by two peaks (in steps I and II) upon the yielding of the seams 25 and 23 and by a plateau (in step III) upon the progressive yielding of the damping seams 21.

According to some non-limiting embodiments not illustrated, the seat belt 5 comprises further two damping devices 19 arranged at the abdominal branches 8 according to what described in the foregoing for the thoracic branches 6.

Although the above-described invention particularly refers to a very precise example embodiment, it is not to be considered limited to such example embodiment, falling within its scope all the variations, modifications or simplifications covered by the appended claims, such as for example a different type of yarn, a different collocation of the seams, a different type of damping device, a different type of vehicle (for example a two-wheel vehicle or a front-drive vehicle), etc.

The present invention has many advantages.

Firstly, it allows protecting the safety of the users in case of accident and/or of extreme stresses simultaneously ensuring the solid anchoring of the traditional four-point seat belts. Therefore, it is possible to maximise the performances without the driver risking injuries or faints due to the abrupt advancement of the head in emergency situations.

Furthermore, the present invention allows optimising the collocation space of the fold thanks to the sacrificial seam.

Finally, the present invention also allows limiting the crushing of the ribs of the user in case of accident, reducing the risk of breaking the same.

LIST OF THE REFERENCE NUMERALS OF THE FIGURES 1 road vehicle
2 wheels
3 passenger compartment
4 seat
5 seat belt
6 thoracic branches
7 backrest
8 abdominal branches
9 fixed portion
10 adjustable portion
11 fixed portion
12 adjustable portion
13 buckle
14 connecting element
15 adjusting element
16 edge
17 end
18 fixing means
19 damping device
20 seat belt portion
21 damping seams
22 fold
23 activation seam
24 damping seam end
25 sacrificial seam
26 initial point
27 final point
28 bridges
A thoracic branch axis
AL average load
AX damping seam axis
C chest
DR driver
E extension
F tension force
I first step
II second step
III third step
PG passenger
TS' first threshold value
TS" second threshold value
U user
Z zone

The invention claimed is:

1. A four-point seat belt (5) comprising:
at least two thoracic branches (6) configured to anchor a chest (C) of a user (U) to a backrest (7) of a vehicular seat (4);
at least two abdominal branches (8) configured to girdle and anchor the waist of the user (U) to the vehicular seat (4);
at least one damping device (19) configured to be activated upon exceeding a first predetermined value (TS') of a tension force (F) imparted by the user (U) to the belt (5); and
a sacrificial seam (25) configured to maintain the thoracic branches (6) substantially with a planar configuration and to break or unravel upon reaching a second predetermined value (TS") of the tension force (F), which is lower than the first predetermined value (TS');
wherein the at least one damping device (19) being configured to cause, upon its activation, a controlled advancement of the chest (C) of the user (U) while limiting the acceleration of the head of the user (U);

wherein the at least one damping device (19) comprises one or more damping seams (21), the damping seams being configured to break or unravel upon the activation of said damping device (19); wherein the one or more damping seams (21) have a zigzag structure.

2. The four-point seat belt (5) according to claim 1, wherein the at least one damping device (19) is configured to cause a controlled advancement of the chest (C) by extending a portion (20) of the seat belt (5) with an extension stroke (E) from 30 mm to 300 mm.

3. The four-point seat belt (5) according to claim 1, wherein the first predetermined value (TS') ranges from 1 kN to 5 kN.

4. The four-point seat belt (5) according to claim 1, wherein a respective damping device (19) is arranged along a fixed portion (9, 11) of each of the thoracic branches (6).

5. The four-point seat belt (5) according to claim 1, wherein the one or more damping seams (21) are configured to break or unravel with an average load (AL) from 1 kN to 3 kN.

6. The four-point seat belt (5) according to claim 1, wherein the one or more damping seams (21) are made at a fold (22) of the fixed portion (9, 11) of each of the thoracic branches (6).

7. The four-point seat belt (5) according to claim 1, wherein the at least one damping device (19) comprises an activation seam (23) arranged at one end of the damping seam (21) and is configured to break or unravel upon reaching the first predetermined value (TS').

8. The four-point seat belt (5) according to claim 1, wherein the second predetermined value (TS") ranges from 0.8 kN to 2.5 kN.

9. The four-point seat belt (5) according to claim 1, wherein the at least one damping device (19) comprises a plurality of damping seams (21) arranged parallel to each other.

10. The four-point seat belt (5) according to claim 9, wherein the parallel damping seams (21) are configured to be activated by means of a transverse activation seam (23) connecting respective ends thereof.

11. The four-point seat belt (5) according to claim 10, wherein the at least one damping device (19) comprises at least five parallel damping seams (21).

12. The four-point seat belt (5) according to claim 10, wherein each of the parallel damping seams (21) comprises at least twenty bridges.

13. A road vehicle (1) comprising:
four wheels (2), of which at least one pair of wheels (2) is driven;
at least one seat (4); and
at least one four-point seat belt (5) according to claim 1 configured to anchor a user (U) to the seat (4), wherein the thoracic branches (6) are mechanically connected to at least a first portion (20) of a vehicular frame, and the abdominal branches (8) are connected to at least a second portion (20) of the vehicular frame.

\* \* \* \* \*